July 28, 1925.

R. R. EARLE 1,547,909

WARNING SIGNAL SYSTEM

Filed Aug. 28, 1922

Inventor

Ralph R. Earle, by Edward A. Coombs his Attorney

July 28, 1925.

R. R. EARLE

WARNING SIGNAL SYSTEM

Filed Aug. 28, 1922   2 Sheets-Sheet 2

1,547,909

Inventor
Ralph R. Earle,
By Edward A. Coombs
his Attorney

Patented July 28, 1925.

1,547,909

UNITED STATES PATENT OFFICE.

RALPH R. EARLE, OF SAN FRANCISCO, CALIFORNIA.

WARNING-SIGNAL SYSTEM.

Application filed August 28, 1922. Serial No. 584,688.

*To all whom it may concern:*

Be it known that I, RALPH R. EARLE, a citizen of the United States, residing at San Francisco, in the county of San Francisco and State of California, have invented new and useful Improvements in Warning-Signal Systems, of which the following is a specification.

This invention relates to warning or alarm signals to be used in connection with a machine or piece of apparatus to indicate to the operator when certain predetermined limits have been passed. Such limits may be of pressure, as in a boiler, or of speed, as in an engine, motor vehicle, or other moving apparatus. While I do not intend to limit the application of my invention to any particular machine or use, it is well adapted for use on automobiles, to warn the driver when the speed of his car has exceeded a predetermined maximum and when its speed has been reduced below a predetermined minimum, and I will describe the invention as applied to such use. The warning signals may be audible or visible devices, but I prefer to use visible ones, in the form of two electric lamps of different colors, both of which are in circuit as long as the speed lies between the desired maximum and minimum and one or the other of which is extinguished whenever one or the other of said limits is exceeded.

It is a well known fact that, when operating a motor car in traffic or at high speed in the country, the driver's eyes are focused at a considerable distance in advance of the car. If he wishes to know what speed he is making, he must change the focus of his eyes, shift his angle of vision and read the speedometer at very close range. All this requires time and is a strain on the driver's eyes and nerves, as to take his eyes from the road ahead, for even a second or two, may spell disaster. It is also well known that the human eye sees in a general way objects at which it is not directly looking and that the mind records impressions subconsciously or without any conscious effort of the brain. This is illustrated by the fact that one's attention will at once be attracted by the extinction of one light only in a room illuminated by several lights, although one was not previously conscious of the fact that several lights were burning.

I make use of these facts in the construction and operation of the warning signal system which constitutes my present invention, by placing the two lights of different colors in the line of vision of the operator so that, in the normal operation of the machine, he will not be conscious of them or have his eyes focused on them but his attention will inevitably be called to the fact that one of them has gone out, so that, without changing the focus of his eyes or his angle of vision, he will know that he has exceeded one of the predetermined speed limits. It will be obvious that this principle of warning signal system is equally applicable to indicate undesirable variations in the pressure of a steam boiler, in the level of a liquid, the number of revolutions of a shaft, in the course of direction of a vessel, etc., said principle being the maintenance of a continuous indication that conditions are normal as long as such is the case and the changing of said indication, to which the eye or ear has become accustomed, whenever conditions become abnormal. In this particular, I believe that my system differs from all prior ones. In its application to an automobile, I prefer to locate the visual signal devices on the lower part of the wind-shield, just beneath the normal line of vision of the driver while, in other uses of the system, they will be placed in such a position that the operator or person in charge will have his attention called when a change in said devices takes place.

As applied to speed control, the invention comprises two adjustable contact members, which can be set at the desired maximum and minimum, and a movable contact member the angular position of which is determined at all times by the speed of the car or machine, preferably by means of a centrifugal governor, the two lamps, one showing, for example, a red light and the other a green light, and suitable electric connections whereby both lights are maintained illuminated as long as the speed does not exceed the maximum or diminish below the minimum speeds chosen.

In the accompanying drawing.

Figure 1:
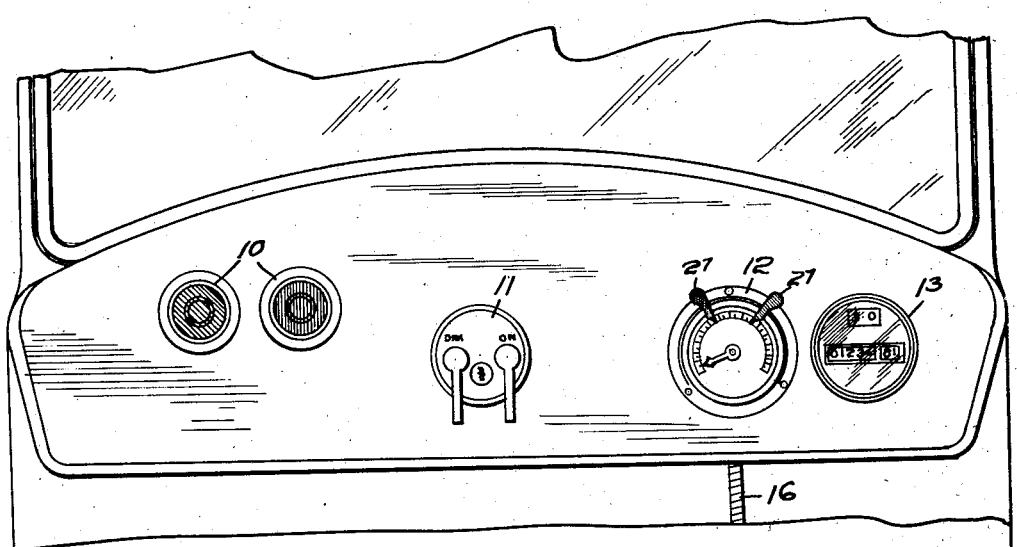
Fig. 1 is a front elevation of the dash or instrument board of an automobile or motor boat equipped with my warning signal system.

The signal lamps, one showing a red light and the other a green light, are shown at 10, the switch controlling the car lights and ignition at 11, the casing containing the controlling mechanism of my signal system at 12, and the usual speedometer at 13, all mounted, as illustrated in Fig. 1, on the instrument board below the wind-shield of an automobile, but it will be obvious that the lamps 10 may be located elsewhere if desired.

Within the casing 12 is a small centrifugal ball governor 14, the shaft 15 of which is driven, as by a flexible shaft 16, from any moving part of the vehicle, so that the speed of rotation of said shafts is always proportional to the speed of the vehicle. The governor ball arms are connected to a disc 17, slidable on the shaft 15 and acting upon the crank pin 18 of an arm 19 carried by the shaft 20, journalled centrally in the casing 12 and carrying on its front end the indicating hand 21, which plays over the circular scale 22, graduated to miles per hour. A coil spring 23 tends to turn the shaft 20 backwardly and to keep the crank pin 18 in contact with the disc 17. The front of the casing is closed by a glass 24, on which the scale 22 may be inscribed. Loosely mounted on the shaft 20 are two arms 25, projecting through slots in the casing and extending forwardly and then downwardly to form indicator pointers 26, cooperating with the scale 22, while upstanding portions 27 form finger pieces and are preferably colored to correspond to the lamps. These arms are adjustable over the scale and are clamped in adjusted position by set-screws 28, or the like. The arms 25, within the casing, carry respectively contacts 35 and 36, with which they engage at certain times the contacts 33 and 34, carried by the arms 29 and 30, respectively, which arms are also loosely mounted on the shaft 20 and are pressed towards the contacts 35 and 36 by their respective springs 31 and 32. Contacts 33 and 34 are electrically connected by wires 37 and 38 to terminals 40, mounted on but insulated from the casing 12 and from which wires 41 and 42 run to the lamps 10 and thence the circuit is completed back to the casing at terminal 46, through the battery 45, by wire 43. It will be understood that the casing constitutes a "ground" connection and that the arms 25 and their contacts 35 and 36 are conductively connected with said ground.

Figures 3, 4:
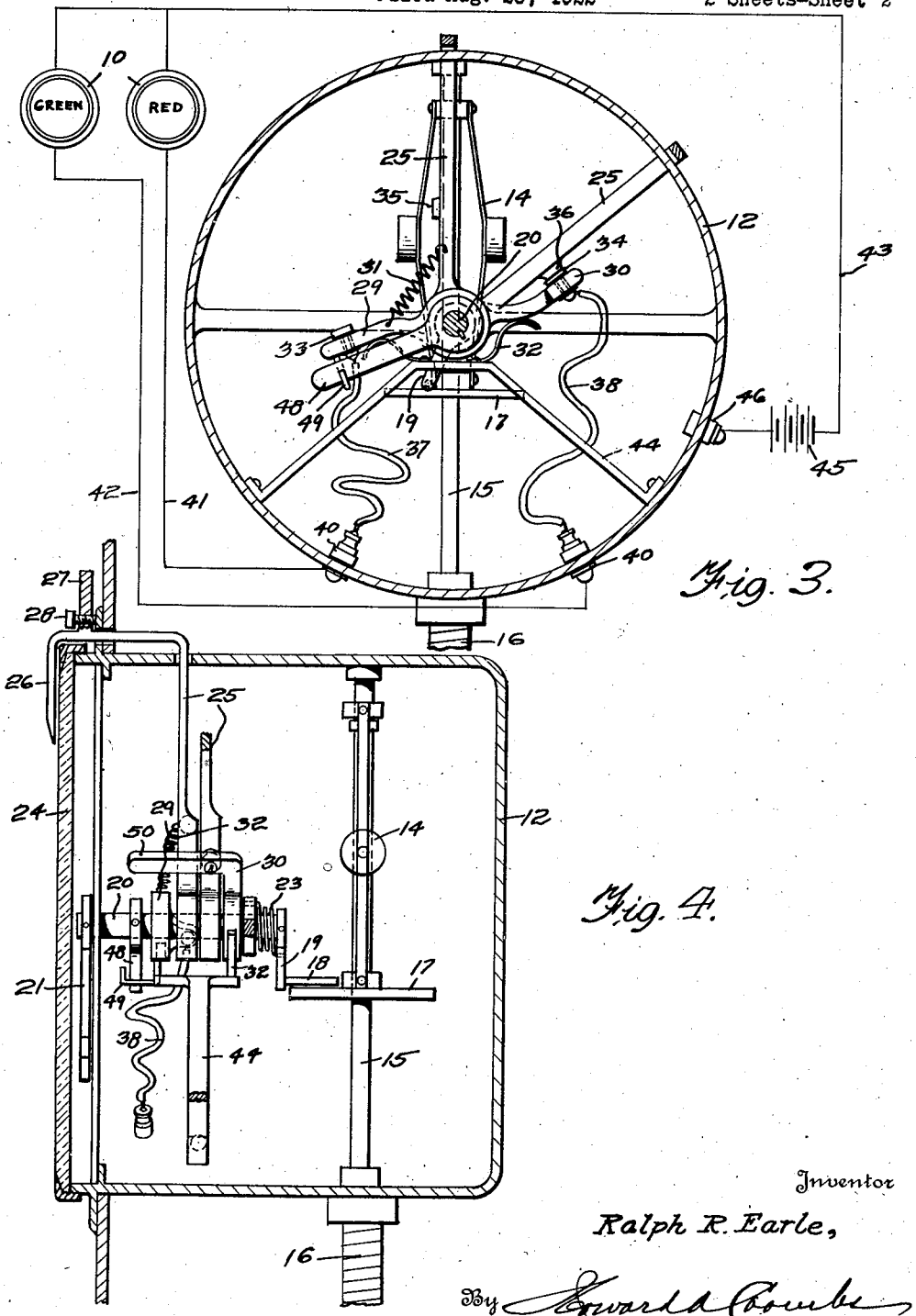
Fig. 3 is a similar view with the dial face removed and showing the lamps and their circuits.
Fig. 4 is a section of the casing from front to rear, showing the governor and contact members in side elevation.

Fast on the shaft 20 is the actuating arm 48 which, in the position shown in Fig. 3, is in engagement with a hook member 49 carried by the contact arm 29. Arm 30 has a lateral extension 50, by which it can engage arm 48, as will now be explained.

Figure 2:
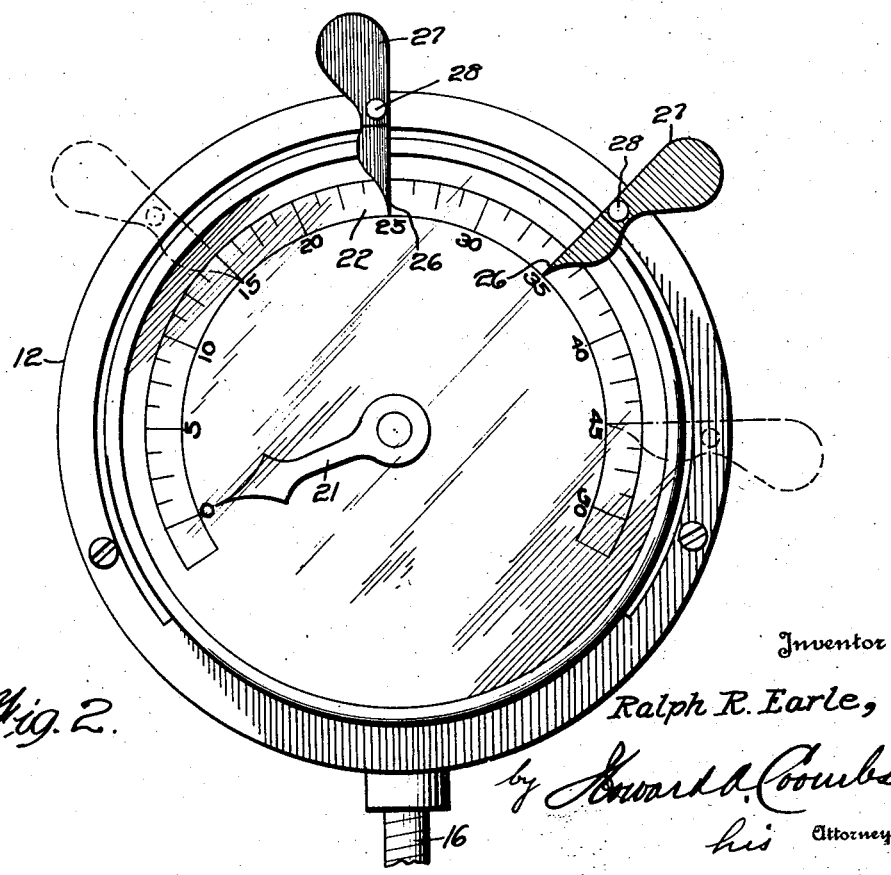
Fig. 2 is a front elevation, on a larger scale, of the casing containing the mechanism for controlling the circuits.

Let us assume that the speed limits which are chosen to define the "normal" range of speeds, are 25 and 35 miles per hour, respectively, and the arms 25 are set at those limits, as illustrated in Fig. 2. The car being at rest or just starting, the circuit through the green lamp is closed through contacts 34 and 36, while that of the red lamp is open, contact 33 being held away from contact 35 by actuating arm 48 which is in engagement with the hook 49 of arm 29. This condition continues until the speed has attained the minimum "normal" speed of 25 miles per hour. At that time, the governor balls have risen sufficiently to turn the shaft 20 and, with it, the actuating arm 48 in clockwise direction until the arm 29, under the influence of its spring 31, has been allowed to turn also and bring its contact 33 into engagement with the contact 35 on the arm 25, whereby the circuit through the red lamp is closed, both lamps being now illuminated and so remaining as long as the speed continues between 25 and 35 miles per hour. As the speed increases above 25 miles per hour, the actuating arm 48 continues to turn to the right, until finally it comes into contact with the extension 50 of contact arm 30, whereby contact 34 of the latter is separated from contact 36 of the arm 25 corresponding to the green lamp. Consequently the green lamp is extinguished, leaving the red lamp burning alone. As the speed is diminished, the reverse sequence of operations, of course, takes place, the result being that, as long as the car is being driven at "normal" speed, in the case assumed, between 25 and 35 miles per hour, the driver's attention is not specifically attracted by the signal lamps because both of them are burning. But, if he exceeds the speed selected as the maximum permissible, his attention is attracted to that fact by the extinction of the green light and, on the other hand, if he reduces the speed below the minimum of 25 miles, his attention is drawn to that fact by the extinction of the red light. While changes may obviously be made in the selection of the kind of signal, the variations which they undergo when the limits chosen are surpassed, as well as in the limits to be chosen, it will be understood that the essential feature of my improved warning signal system lies in the maintenance of certain conditions as long as operating conditions are normal, or between the selected limits, and in the changing of those conditions when either limit is surpassed, so that the operator's attention will be attracted subconsciously, so to speak, without his having to change his focus or angle of vision or think about it.

Having thus described my invention, what I claim is:

1. A warning signal system of the kind described, comprising two adjustable limit contact members, two electric signal devices in circuit with said members, two movable contact members adapted to engage said adjustable contact members, and an actuating member responsive to variations in speed conditions and constructed and arranged to control said movable contact members, whereby said signal devices are maintained operative as long as conditions are "normal" but one or the other of them will be rendered inoperative whenever either the maximum limit or the minimum limit of the variable conditions is surpassed.

2. A limit warning signal system for the operator of a moving vehicle, comprising two electric lamps of different colors located in his line of vision, a governor driven by the vehicle, a rotatable arm controlled by said governor, two movable contact members adapted to be successively engaged by said arm, two adjustable fixed contact members, and yielding means adapted to hold said pairs of contact members in engagement, whereby both said lamps are maintained illuminated as long as the operating limits determined by the position of said adjustable contact members are not surpassed but one or the other of said lamps will be extinguished when either of said limits is surpassed.

In testimony whereof I have hereunto set my hand.

RALPH R. EARLE.